US008971314B2

(12) United States Patent
Mitchell

(10) Patent No.: US 8,971,314 B2
(45) Date of Patent: *Mar. 3, 2015

(54) SS7 ANSI-41 TO SIP BASED CALL SIGNALING CONVERSION GATEWAY FOR WIRELESS VOIP E911

(75) Inventor: Don Mitchell, Bellevue, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 281 days.

This patent is subject to a terminal disclaimer.

(21) Appl. No.: 13/437,244

(22) Filed: Apr. 2, 2012

(65) Prior Publication Data

US 2012/0188943 A1    Jul. 26, 2012

Related U.S. Application Data

(62) Division of application No. 11/417,128, filed on May 4, 2006, now Pat. No. 8,155,109.

(60) Provisional application No. 60/788,713, filed on Apr. 4, 2006.

(51) Int. Cl.
*H04L 12/66* (2006.01)

(52) U.S. Cl.
CPC ..................... *H04L 12/66* (2013.01)
USPC ........... 370/352; 370/392; 370/356; 370/355; 370/354; 370/351

(58) Field of Classification Search
USPC ................. 370/352–356, 329, 392
See application file for complete search history.

(56) References Cited

U.S. PATENT DOCUMENTS

| 4,625,081 | A  | 11/1986 | Lotito |
| 5,712,900 | A  | 1/1998  | Maupin |
| 5,937,344 | A  | 8/1999  | Zicker |
| 6,275,937 | B1 | 8/2001  | Hailpern |
| 6,535,743 | B1 | 3/2003  | Kennedy, III |
| 6,556,816 | B1 | 4/2003  | Gafrick |
| 6,675,017 | B1 | 1/2004  | Zellner et al. |

(Continued)

FOREIGN PATENT DOCUMENTS

| DE | WO/2004021726 | 3/2004 |
| WO | PCT/IB02/04436 | 10/2002 |
| WO | PCT/US04/042456 | 12/2004 |

OTHER PUBLICATIONS

International Search Report received in PCT/US2012/067857 dated Feb. 20, 2013.

(Continued)

*Primary Examiner* — Khaled Kassim
(74) *Attorney, Agent, or Firm* — William H. Bollman

(57) ABSTRACT

An SS7-based call protocol conversion gateway that translates between circuit-switched SS7 protocols and session initiation protocol (SIP) oriented protocol, allowing an E911 call initiated over a switched network to be routed by a VoIP network. The SS7-based call protocol conversion gateway provides a PSAP with MSAG quality (street address) information about a VoIP dual mode phone user without the need for a wireless carrier to invest in building out an entire VoIP core. Thus, wireless carriers may continue signaling the way they are today, i.e., using the J-STD-036 standard for CDMA and GSM in North America, yet see benefits of a VoIP network core, i.e., provision of MSAG quality location data to a PSAP.

12 Claims, 10 Drawing Sheets

(56) References Cited

U.S. PATENT DOCUMENTS

| | | |
|---|---|---|
| 6,721,396 B2 | 4/2004 | Chin |
| 6,865,266 B1 | 3/2005 | Pershan |
| 6,925,504 B1 | 8/2005 | Liskov |
| 7,031,724 B2 | 4/2006 | Ross |
| 7,194,249 B2 | 3/2007 | Phillips |
| 7,277,938 B2 | 10/2007 | Duimovich |
| 7,516,198 B1 | 4/2009 | Appala |
| 7,526,563 B2 | 4/2009 | Ingimundarson |
| 7,617,287 B2 | 11/2009 | Vella |
| 7,627,331 B2 | 12/2009 | Winterbottom |
| 7,684,782 B2 | 3/2010 | Ashley |
| 7,822,391 B1 | 10/2010 | Delker |
| 7,822,871 B2 | 10/2010 | Stolorz |
| 7,895,263 B1 | 2/2011 | Kirchmeier |
| 2002/0055924 A1 | 5/2002 | Liming |
| 2002/0069079 A1 | 6/2002 | Vega |
| 2002/0086659 A1 | 7/2002 | Lauper |
| 2002/0099802 A1 | 7/2002 | Marsh |
| 2002/0111159 A1 | 8/2002 | Faccin |
| 2002/0113797 A1 | 8/2002 | Potter |
| 2002/0136364 A1 | 9/2002 | Stumer |
| 2002/0141386 A1 | 10/2002 | Minert |
| 2002/0154221 A1 | 10/2002 | Ishimaru |
| 2002/0174073 A1 | 11/2002 | Nordman |
| 2003/0063714 A1 | 4/2003 | Stumer |
| 2003/0063730 A1 | 4/2003 | Woodring |
| 2003/0081752 A1 | 5/2003 | Trandal |
| 2003/0081754 A1 | 5/2003 | Esparza |
| 2003/0115261 A1 | 6/2003 | Mohammed |
| 2003/0125021 A1 | 7/2003 | Tell et al. |
| 2003/0135493 A1 | 7/2003 | Phelan et al. |
| 2003/0163483 A1 | 8/2003 | Zingher |
| 2003/0186709 A1 | 10/2003 | Rhodes |
| 2003/0187803 A1 | 10/2003 | Pitt |
| 2003/0222901 A1 | 12/2003 | Houck |
| 2004/0064500 A1 | 4/2004 | Kolar et al. |
| 2004/0093217 A1 | 5/2004 | Yeh |
| 2004/0107143 A1 | 6/2004 | Niemi |
| 2004/0156394 A1 | 8/2004 | Westman |
| 2004/0157175 A1 | 8/2004 | Matsumoto |
| 2004/0184584 A1 | 9/2004 | McCalmont |
| 2004/0190497 A1 | 9/2004 | Knox |
| 2004/0203919 A1 | 10/2004 | Ross |
| 2004/0242191 A1 | 12/2004 | Hossain |
| 2004/0247090 A1 | 12/2004 | Nurmela |
| 2005/0031095 A1 | 2/2005 | Pietrowicz |
| 2005/0039135 A1 | 2/2005 | Othmer |
| 2005/0047399 A1 | 3/2005 | Lee et al. |
| 2005/0071251 A1 | 3/2005 | Linden |
| 2005/0144322 A1 | 6/2005 | Miyajima |
| 2005/0148353 A1 | 7/2005 | Hicks, III et al. |
| 2005/0181805 A1 | 8/2005 | Gallagher |
| 2005/0186948 A1 | 8/2005 | Gallagher |
| 2005/0188078 A1 | 8/2005 | Kotzin |
| 2005/0190892 A1 | 9/2005 | Dawson |
| 2005/0195954 A1 | 9/2005 | Klein |
| 2005/0201358 A1 | 9/2005 | Nelson |
| 2005/0202799 A1 | 9/2005 | Rollender |
| 2005/0213537 A1 | 9/2005 | Ingimundarson et al. |
| 2005/0215233 A1 | 9/2005 | Perera |
| 2005/0216300 A1 | 9/2005 | Appelman |
| 2005/0272424 A1 | 12/2005 | Gallagher |
| 2005/0272449 A1 | 12/2005 | Gallagher |
| 2005/0287979 A1 | 12/2005 | Rollender |
| 2006/0044407 A1 | 3/2006 | Barbeau |
| 2006/0073812 A1 | 4/2006 | Punaganti Venkata et al. |
| 2006/0079236 A1 | 4/2006 | Del Pino |
| 2006/0099935 A1 | 5/2006 | Gallagher |
| 2006/0106774 A1 | 5/2006 | Cohen |
| 2006/0135177 A1 | 6/2006 | Winterbottom |
| 2006/0154665 A1 | 7/2006 | Svensson |
| 2006/0184617 A1 | 8/2006 | Nicholas |
| 2006/0189303 A1 | 8/2006 | Rollender |
| 2006/0205383 A1 | 9/2006 | Rollender |
| 2006/0206610 A1 | 9/2006 | Ling |
| 2006/0236258 A1 | 10/2006 | Othmer |
| 2007/0008885 A1 | 1/2007 | Bonner |
| 2007/0027997 A1 | 2/2007 | Polk |
| 2007/0060097 A1 | 3/2007 | Edge |
| 2007/0104183 A1 | 5/2007 | Bakke |
| 2007/0190968 A1 | 8/2007 | Dickinson |
| 2007/0201623 A1 | 8/2007 | Hines |
| 2007/0202844 A1 | 8/2007 | Wilson |
| 2007/0218871 A1 | 9/2007 | Bonner |
| 2007/0238448 A1 | 10/2007 | Gallagher |
| 2008/0045250 A1 | 2/2008 | Hwang |
| 2008/0080488 A1 | 4/2008 | Marsico |
| 2008/0192731 A1 | 8/2008 | Dickinson |
| 2008/0208671 A1 | 8/2008 | Ehrlich |
| 2008/0268809 A1 | 10/2008 | Busin |
| 2009/0198733 A1 | 8/2009 | Gounares |
| 2009/0204470 A1 | 8/2009 | Weyl et al. |
| 2009/0204600 A1 | 8/2009 | Kalik |
| 2009/0237210 A1 | 9/2009 | Ciesla |
| 2010/0010860 A1 | 1/2010 | Bose |
| 2010/0198933 A1 | 8/2010 | Smith |
| 2010/0233991 A1 | 9/2010 | Crawford |
| 2010/0262668 A1 | 10/2010 | Piett |
| 2011/0207429 A1 | 8/2011 | Maier |
| 2012/0079600 A1 | 3/2012 | Kellerman |

OTHER PUBLICATIONS

International Search Report received in PCT/US2012/67689 dated Feb. 22, 2013.
International Search Report received in PCT/US2012/066313 dated Feb. 4, 2013.
International Search Report received in PCT/US2012/00266 dated Aug. 3, 3012.
http://en.wikipedia.org/wiki/imsi, Wikipedia Encyclopedia, International Mobile Subscriber Identity, pp. 1-4, printed on Sep. 4, 2008.
Harry Newton, Newton's Telecom Dictionary, Feb. 2000, Telecom Books, 16th edition, p. 427.
International Search Report received in PCT/US2006/27658 dated Feb. 13, 2007.
PCT Notification of Transmittal of the International Search Report and the Written Opinion of the International Searching Authority, or the Declaration, Feb. 14, 2008.
Winterbottom et al., GEOPRIV PIDF-LO Usage Clarification, Considerations and Recommendations, Geopriv, Feb. 12, 2005, pp. 1-19.
European Search Report in Appl. No. EP07 71 6216 dated Dec. 12, 2009.
Zehua et al., "On Querying Geospatial and Georeferenced Metadata Resources in G-Portal," IEEE Comp. SOC, May 31, 2003, pp. 245-255.
Peterson et al., "A Presence-Based GEOPRIV Location Object Format; rfc4119,txt," Neustar, Dec. 1, 2005, pp. 1-23.
Winterbottom, et al., "GEOPRIV PIDF-Lo Usage Clarification, Considerations and Recommendations; draft-ietf-geopriv-pdif-lo-profile-00.txt," Nortel, Jul. 2, 2005, pp. 1-31.
Berners-Lee, et al., "Uniform Resource Identifier (URI) Generic Standard, Internet Engineering Task Force," Day Software, Jan. 1, 2005, pp. 1-61.
Linden, Greg, Geeking with Greg, Exploring the Future of Personalized Information, glinden.blogspot.com, pp. 1-2.

BASIC E911 - GSM

BASIC E911 – CDMA, TDMA

SS7 ANSI-41 TO SIP BASED CALL SIGNALING CONVERSION GATEWAY FOR WIRELESS VOIP E911

The present application is a division of U.S. patent application Ser. No. 11/417,128, entitled "SS7 ISUP TO SIP BASED CALL SIGNALING CONVERSION GATEWAY FOR WIRELESS VOIP E911", filed on May 4, 2006, now U.S. Pat. No. 8,155,109; which claims priority from U.S. Provisional Patent Application No. 60/788,713, filed Apr. 4, 2006, entitled "SS7 ANSI-41 TO SIP BASED CALL SIGNALING CONVERSION GATEWAY FOR WIRELESS VoIP E911", to Mitchell, the entirety of which are expressly incorporated herein by reference.

BACKGROUND OF THE INVENTION

1. Field of the Invention

This invention relates generally to E9-1-1 emergency phone calls. More particularly, it relates to handling emergency E9-1-1 calls using Voice Over Internet Protocol (VoIP).

2. Background of the Related Art

Voice Over Internet Protocol (VoIP) is a technology that has been developed as an alternative packet-based telephony technology to the conventional switched telephony service (e.g. PSTN). VoIP takes advantage of high speed Internet data networks, and is able to provide low cost telephony services to end users. VoIP technology emulates a phone call, but instead of using a circuit based switched system such as the telephone network, utilizes packetized data transmission techniques most notably implemented in the Internet.

VoIP phone calls are routed to a VoIP voice gateway, from which they are passed on to their destination VoIP device. Conventional VoIP voice gateways (i.e., soft switches) are typically located in only a few places across the country. A soft switch is a programmable network switch that can process the signaling for all types of packet protocols. Also known as a 'media gateway controller,' 'call agent,' or 'call server,' such devices are used by carriers that support converged communications services by integrating signaling system No. 7 (SS7) type switched telephone signaling with packet networks. Softswitches can support, e.g., IP, DSL, ATM and frame relay.

Because VoIP is Internet Protocol (IP) based, call related information such as CallerID type services may not be available or accurate. A location of a given VoIP device may be statically provisioned to be at a given geographic location, or queried from a home location register (HLR) in a mobile system.

911 is a phone number widely recognized as an emergency phone number that is routed to emergency dispatch personnel and used to determine a location of a caller. Enhanced 911 (E911) is defined by the transmission of callback number and location information to the relevant public safety answering point (PSAP). A PSAP is the endpoint of an emergency services call. PSAPs are responsible for answering emergency services calls. E911 may be implemented for landline and/or mobile devices. Some Public Safety Access Points (PSAPs) are not enhanced, and thus do not receive the callback or location information from any phone, landline or mobile.

The problem is not necessarily solved with the use of a centralized emergency call center. In such case, when a VoIP customer places an emergency call such as an E911 call, the call may be routed to an emergency call center that is very far away, and in some instances half-way across the world to reach the centralized emergency call center. The VoIP E911 call must then be transferred to the relevant 911 center (public safety access point (PSAP)). However, this transfer must take place over the Public Switched Telephone Network (PSTN) because such transfer cannot conventionally be gained to the PSAP's existing Enhanced 911 (E911) dedicated network where location and callback number of the originating 911 caller are provided. Moreover, note that even the call related information (e.g., CallerID) provided with the call would relate to the identity and location of the centralized call center—not to the callback number and certainly not the location of the customer originally dialing 911.

FIG. 7A shows conventional relevant systems in an emergency 911 call made via a wireless caller in a GSM network.

In particular, as shown in FIG. 7A, a wireless GSM caller 190 dials 911. The 911 call is serviced by a cell site of a service provider, which includes a given mobile servicing center (MSC) 402. The MSC 402 performs a query of a PSAP Automatic Location Identification (ALI) database 406 via a gateway mobile location centre (GMLC) 432 to determine a unique 10-digit phone number of the proper local PSAP physically responsible for the location of the 911 caller 190.

FIG. 7B shows conventional relevant systems in an emergency 911 call made via a wireless caller in a CDMA or TDMA network.

In particular, as shown in FIG. 7B, a wireless CDMA or TDMA caller 190*b* dials 911. The 911 call is serviced by a cell site of a service provider, which includes a given mobile servicing center (MSC) 402. The MSC 402 performs a query of a PSAP Automatic Location Identification (ALI) database 406 via a mobile positioning center (MPC) 707 to determine a unique 10-digit phone number of the proper local PSAP physically responsible for the location of the 911 caller 190*b*.

As technology progresses, dual mode wireless phones have emerged. A dual mode wireless phone is one that operates using CDMA or GSM technology when out on the open road, but which switches to a local area network such as a Wireless Fidelity (WiFi) network when within range at home or in the office. For instance, a wireless phone may join a WiFi network created in a home or office used by a wireless computer network, when within range of that WiFi network, to gain access to the Internet and thus communicate using voice over Internet Protocol (VoIP). Thus, dual mode phones operate as an ordinary cell phone as a mobile user traverses a cell network (e.g., a CDMA network), until you get home or to your office containing a WiFi network, at which time the cell phone drops use of the CDMA network and instead switches over to use of the WiFi network.

When a wireless phone is mobile and away from home or the office, latitude/longitude location information is pretty much the best that can be provided. However, when within a home or office on a WiFi network, it is preferable that more accurate location information such as MSAG format location information including street address be provided instead of merely lat/lon type location information.

Unfortunately, provision of MSAG format location information along with a WiFi wireless call presents significant expense to a wireless carrier. Instead, without change to the wireless carrier's network, lat/lon location information is the best that can be provided in all cases, even when the wireless dual mode phone is communicating over the Internet using a WiFi network.

FIG. 8 shows one conventional solution to delivery of location data in wireless E911 format, but providing only latitude/longitude (lat/lon) location information.

In particular, as shown in FIG. 8, a wireless caller 190 using a dual mode phone dials 911.

A user agent 180 provides service to the wireless VoIP device 190 so that the dual mode phone is provided with wireless Internet access. ("User agent" is a common name for a device that makes a VoIP call, e.g., a SIP phone, Skype™ on a Personal Computer, etc.)

The call then progresses over the Internet (Voice Over Internet Protocol (VoIP)) via a wireless fidelity (WiFi) access point 170. A WiFi access point 170 is, e.g., a wireless local area network hub in a house or office. The WiFi access point 170 provides Internet access to the wireless dual mode phone 190 typically via a wired connection to the Internet. (While described with respect to WiFi, the invention as described below relates equally to later embodiments of local area network hot spots (e.g., WiMAX, etc.).

A wireless VoIP base station controller 160 communicates with the WiFi access point 170 to provide circuit switched, time-division multiplexing (TDM) access to the VoIP call.

The user agent 180, WiFi access point 170 and a Wireless VoIP base station controller 160 use TCP/IP transport and session initiation protocol (SIP) protocols.

From the wireless VoIP base station controller 160, the VoIP E911 call is passed to a mobile switching center (MSC) 800. If part of a CDMA network, the MSC 800 passes an Origination Request (ORREQ) message (IS-41) to a $3^{rd}$ Generation Partnership (3GPP2) mobile positioning center (MPC) 802 per the 3GPP2 joint standard #36 (J-STD-036). The ORREQ starts the process where location is ultimately obtained from a Position Determination Entity (PDE). The PDE consumes, or uses, the location information itself.

If part of a GSM network, the MSC 800 passes a subscriber location report (SLR) request to a Gateway Mobile Location Center (GMLC) 802. An SLR is a push of location. Thus, location is actually obtained before the message is sent. In such a GSM network, the MSC 800 actually gets the location back from the network element (SMLC) on the time division multiplex (TDM) side. The MSC 800 then provides the location to the GMLC 802.

The VoIP E911 call is then directed to a selective router 140 serving the designated public safety access point (PSAP)/911 network 195 for the determined lat/lon location.

FIG. 9 shows a conventional delivery of location data in MSAG format for VoIP calls for processing E911 calls using the NENA approved i2 call flow.

In particular, as shown in FIG. 9, a dual mode phone user 190 makes a 911 call over their WiFi network as otherwise described in FIG. 8. For instance, the VoIP E911 call is serviced by a user agent 180, a WiFi access point 170, and a wireless VoIP base station controller 160, as otherwise shown and described with respect to FIG. 8. However, in the embodiment of FIG. 9, the wireless carrier is a voice service provider network 900, enjoying the benefits of a VoIP network.

The voice service provider network 900 passes a SIP invite message to a VoIP positioning center 904. The SIP invite is used to get location information from the VPC 904. In this scenario, location is determined by the VPC 904, and the VPC 904 is used to make decisions based on that location. In particular, the VPC 904 sends signaling to the VSP 900 so that it can get the call to the right PSAP 195, but the location information itself is not sent back to the VSP 900. Rather, just signaling codes necessary to route the VoIP E911 call to the proper selective router 140 and PSAP 195 (via an emergency services gateway 902) are sent from the VPC 904 to the VSP 900. (An emergency services gateway (ESGW) is typically a function inside a standard media gateway. A media gateway is typically TCP/IP on one side, and TDM trunks on the other side.)

Location information itself in the embodiment of FIG. 9 is maintained in a subscriber line database (SLDB), created from an out-of-band transaction. This means that the dual-mode phone user 190 presets their MSAG format location into the SLDB, e.g., by logging into a suitable SLDB portal during registration of their dual-mode phone, and enters their location (e.g., relevant street address). The PSAP 195 accesses this MSAG quality location information using a automatic location identificatier (ALI) query to the VPC 904, which in turn pulls location data from the SLDB, formats it, and provides it back to the PSAP 195.

Trials have been conducted in which a local exchange carrier (LEC) has permitted access to a selective router for the E911 network via the PSTN. In this trial, the LEC designated a specific 10-digit telephone number. A caller has their emergency call transferred to this 10-digit telephone number, which is then call-forwarded within the central office to the selective router, which then forwards the call to the correct PSAP based upon the digits dialed. However, this solution suffers the same significant drawbacks as that shown in FIG. 7, i.e., that callback number and location are not provided to the responsible PSAP.

Thus while carriers continue to accommodate and indeed foster development of a nationwide VoIP telephone network, difficulties nevertheless abound, particularly with respect to provision of location of a VoIP caller to an emergency response center. As a result, wireless carriers wishing to offer dual-mode phones to customers must make significant technology investments and infrastructure upgrades to handle VoIP calls. (Dual-mode phones are capable of initiating mobile E9-1-1 calls using, e.g., Global System for Mobile Communications (GSM) or code division, multiple access (CDMA), or even wireless fidelity (WiFi)). The desire is to handle use of such technologies in a VoIP communications network. However, the reality is that many wireless carriers continue to utilize switched technology equipment at least at the front end in communication with a VoIP caller. If an E911 call is placed, it is likely handled in the wireless carrier's network from a circuit switched interface. The present inventors realize that this causes a delay in the introduction of VoIP technology, and reduced competition from other carriers. Moreover, full compliance with national requirements may not be possible, e.g., the need to provide location and callback information.

There is the need for a simple and effective solution to providing easy and full access to the Enhanced 911 network of an emergency services provider (e.g., PSAP) from wireless VoIP users of a carrier utilizing a switched network.

SUMMARY OF THE INVENTION

In accordance with the principles of the present invention, a call protocol conversion gateway comprises a module adapted to receive signaling system number 7 (SS7)-based call signaling. A module is adapted to convert the SS7 ISUP based call signaling into session initiation protocol (SIP)-based call signaling, and a module is adapted to pass the SIP call signaling to a voice over Internet (VoIP) positioning center.

A method of converting a VoIP call, passed over a switched telephone network, into a VoIP call for presentation to a public safety access point (PSAP) in accordance with yet another aspect of the present invention comprises receiving a voice over Internet protocol (VoIP) call from a VoIP phone via a local area network. The VoIP call is routed using signaling system number 7 (SS7) ISUP based call signaling. The SS7 ISUP based call signaling is converted into session initiation protocol (SIP) call signaling.

DETAILED DESCRIPTION OF ILLUSTRATIVE EMBODIMENTS

The present invention provides a signaling system number 7 (SS7) gateway device that translates between circuit-switched SS7 protocols and session initiation protocol (SIP) oriented protocol, allowing an E911 call initiated over a switched network to be routed by a VoIP network.

Figure 8:
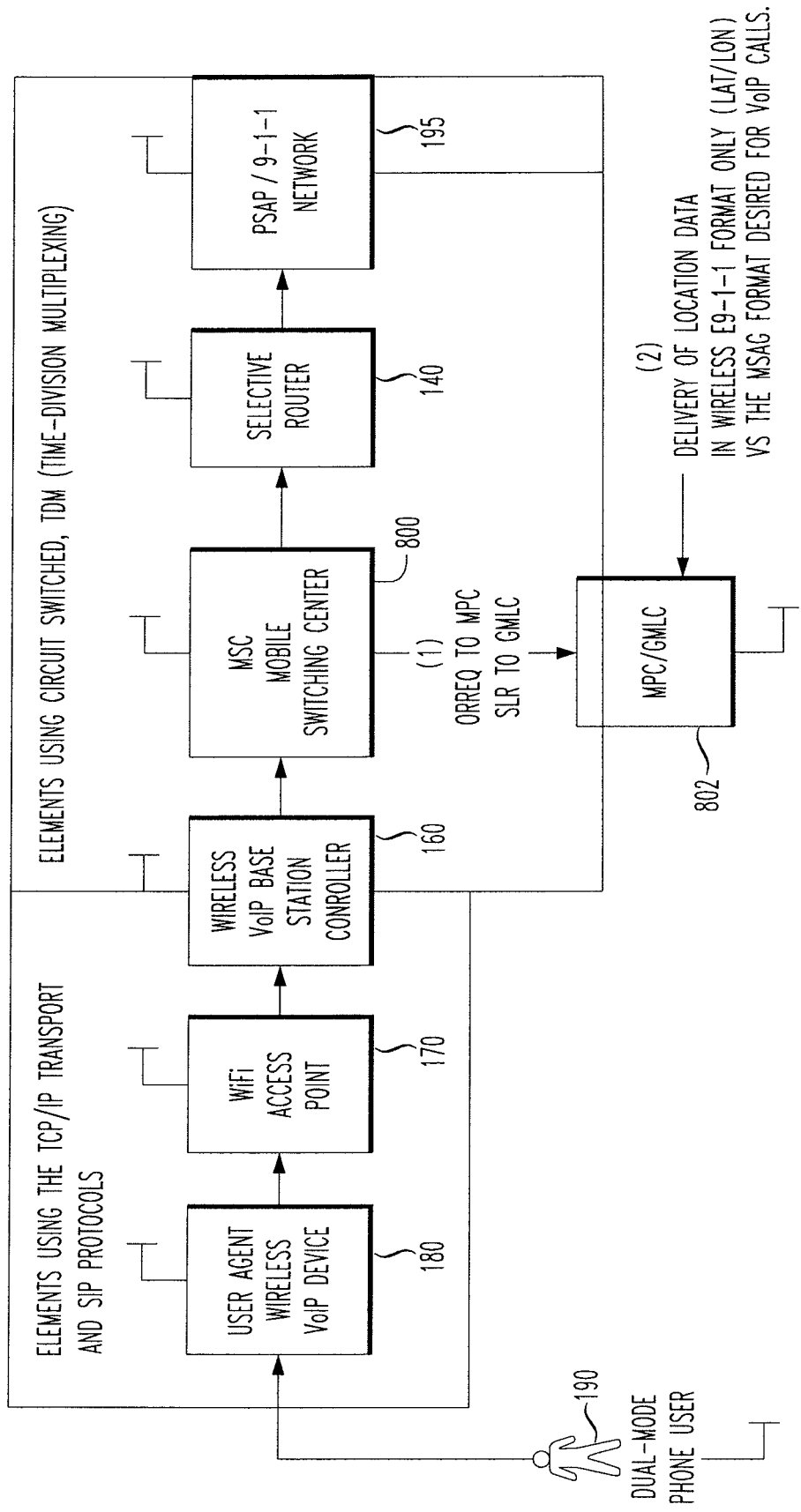
FIG. 8 shows one conventional solution to delivery of location data in wireless E911 format, but providing only latitude/longitude (lat/lon) location information.
Figure 9:
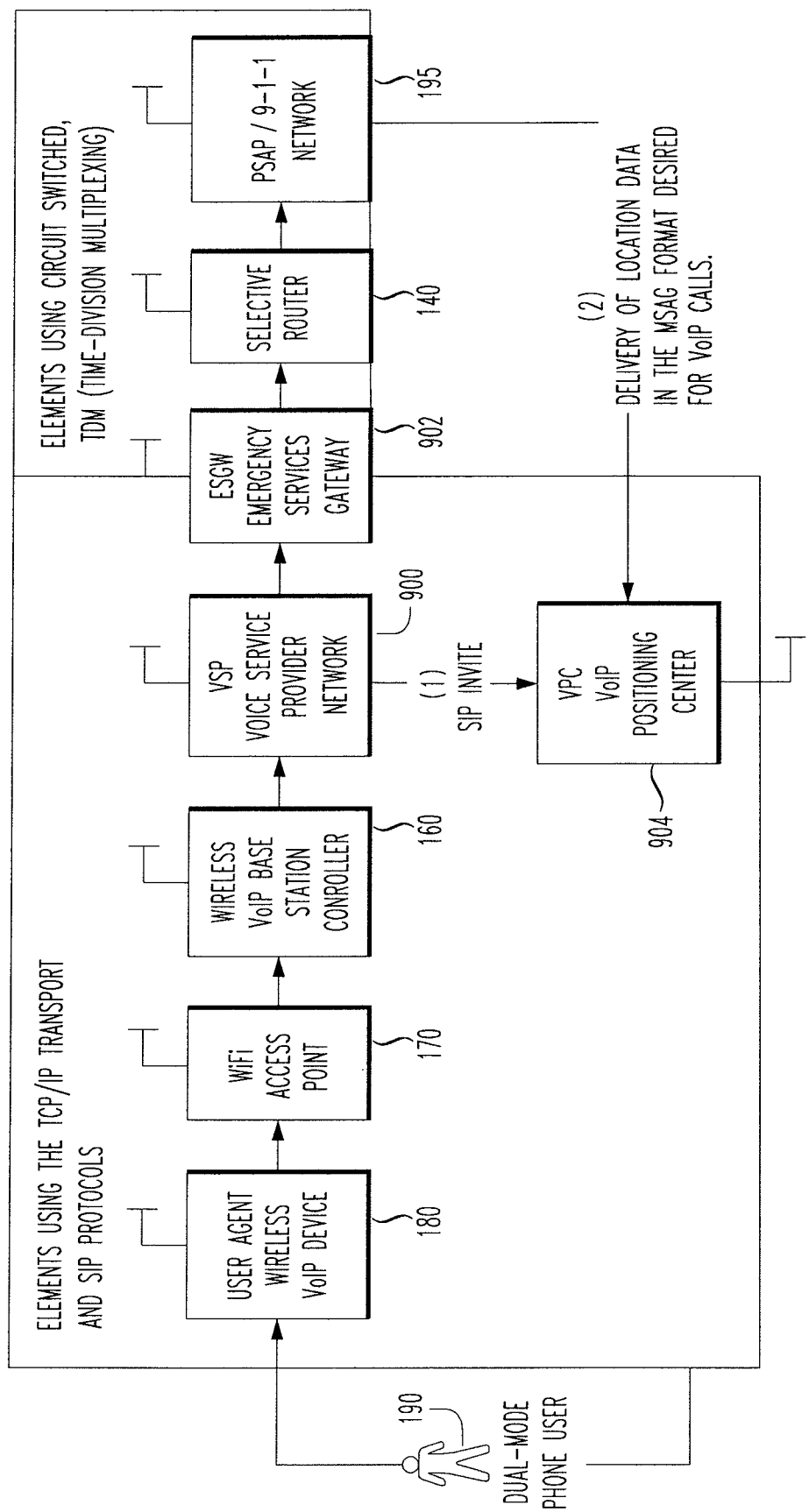
FIG. 9 shows a conventional delivery of location data in MSAG format for VoIP calls for processing E911 calls using the NENA approved i2 call flow.

Use of an SS7 based gateway in accordance with the principles of the present invention, as opposed to the ORREQ technique shown in FIG. 8, or the SIP Invite technique shown in FIG. 9, is that it provides a PSAP with MSAG quality data without the need for carrier's to invest in building out a VoIP core. The SS7 gateway approach forms a marriage of the best features of the embodiments of FIGS. 8 and 9. This saves wireless carriers significant amounts of cash because they don't need to switch to a VoIP core (as in FIG. 9) to have the capability to provide MSAG quality location information over a TDM network (such as the one shown in FIG. 8). This allows carriers to keep their existing networks, while at the same time adding MSAG location capabilities for WiFi users, all at minimal infrastructure cost.

The consumer benefits as well, as use of an SS7 gateway in a TDM network provides emergency services with a high quality MSAG type location rather than just a lat/long quality location, when in their time of need.

Using todays systems, most wireless carriers provide lat/lon quality information for all WiFi callers. While lat/lon information (e.g., cell tower location, etc.) is somewhat accurate, it does not give emergency services personnel total comfort in their locating the caller in a timely fashion. However, using an SS7 based gateway inserted into a VoIP platform including a voice positioning center (VPC), users can use a dual mode phone, dial 911, and MSAG quality location information can be provided to the designated PSAP, all without significant investment in a VoIP core by the wireless carrier. The home or office address (MSAG quality location information) can be given because it's based on the VoIP network.

Thus, wireless carriers may continue signaling the way they are today, i.e., using the J-STD-036 standard for CDMA and GSM in North America, but see benefits of a VoIP network core, i.e., provision of MSAG quality location data to a PSAP.

In one aspect of the invention, SS7 based J-STD-036/Transaction Capabilities Application Part (TCAP) signaling is translated to SIP for purposes of E911 call routing.

Figure 1:
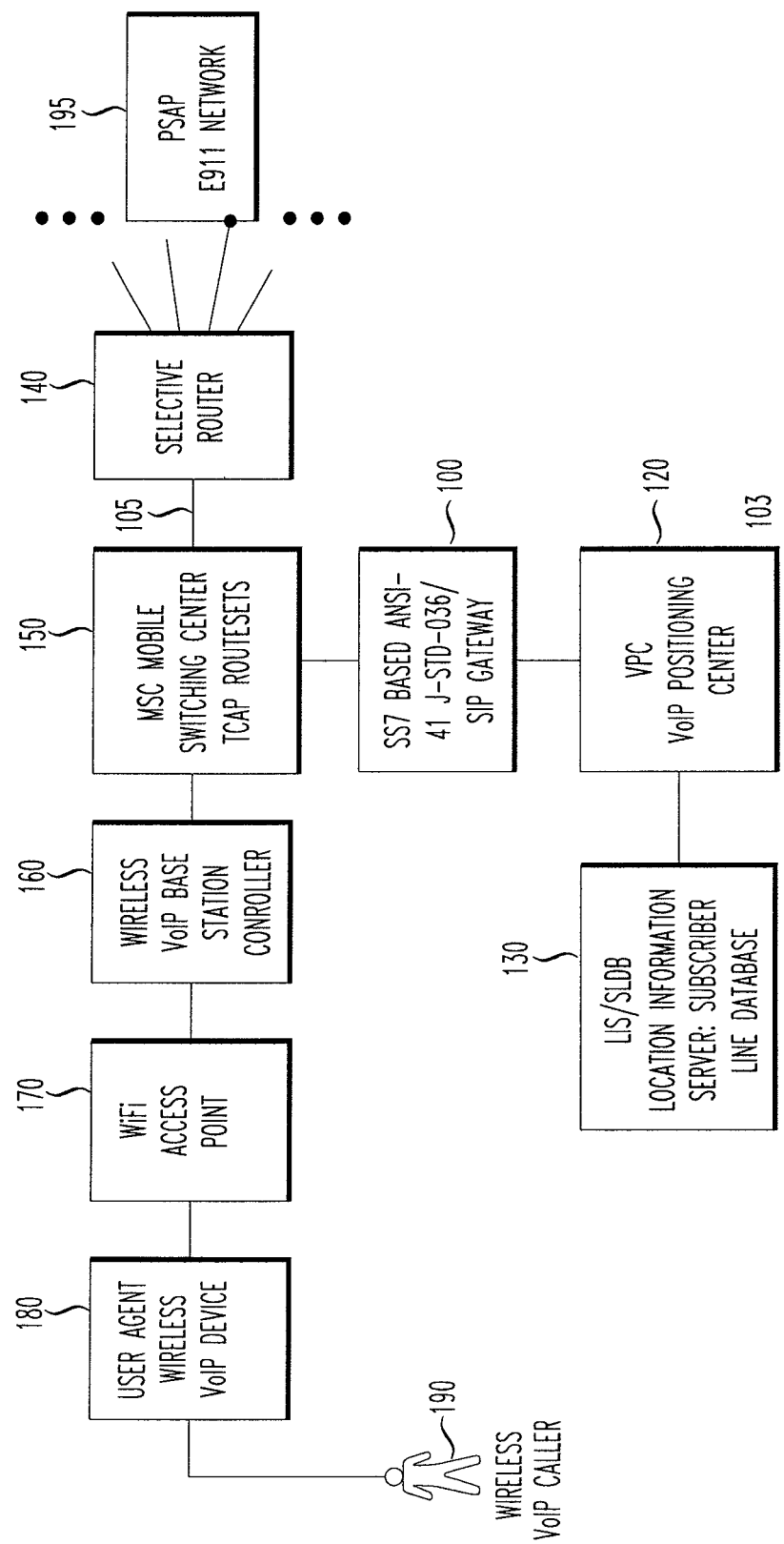
FIG. 1 is a block diagram showing relevant software elements including an SS7 based ANSI-41 J-STD-036 to SIP protocol conversion gateway used to handle placement of an E911 call from a VoIP user through a wireless carrier including switched network components, in accordance with the principles of the present invention.

FIG. 1 is a block diagram showing relevant software elements including an SS7 based ANSI-41 J-STD-036 to SIP protocol conversion gateway used to handle placement of an E911 call from a VoIP user through a wireless carrier including switched network components, in accordance with the principles of the present invention.

In particular, as shown in FIG. 1, a wireless VoIP user 190 places a 911 call, which is serviced by a user agent 180. The user agent 180 gains access to the wired Internet via a WiFi access point 170, and access to the wireless carrier's network via a wireless VoIP base station controller 160.

From the wireless VoIP base station controller 160, the VoIP 911 call over a WiFi network is routed to the wireless carrier's Mobile Switching Center (MSC) 150. Ultimately, the 911 call is routed to an appropriate selective router 140, and then to the proper PSAP E911 network 195.

Importantly, in accordance with the principles of the present invention, 911 calls from the wireless MSC 150 are processed by an SS7 to SIP gateway 100 that accepts and sends SS7 TCAP [Transaction Capability Application Part]/J-STD-036 based signaling, but gateways the call signaling to session initiation protocol (SIP) signaling. Thus, the SS7 to SIP gateway 100 communicates with the MSC 150 to translate from J-STD-036 TCAP to SIP, i.e., between wireless technologies and VoIP location technologies.

Preferably the SIP signaling is compliant to a relevant standard, but there is currently no existing standardized SS7 interfaces allowed by the current standards for VoIP E911, i.e., National Emergency Number Association (NENA) i1/i2 standards for a voice over IP (VoIP) positioning center (VPC).

The SS7 to SIP gateway 100 translates call data received from the MSC 150 (e.g., calling party number) into relevant SIP INVITE parameters. The call data is then passed to a voice over Internet protocol (VoIP) positioning center (VPC) 120 as a VoIP call.

The VPC 120 is an application that determines the appropriate PSAP, based on the location of the 911 caller 190, returns associated routing instructions to the VoIP network, and provides the callback number to the PSAP 195 through an automatic location identifier (ALI). (An ALI is a database that relates a specific telephone number to an address. This database accepts a PSAP query with a telephone number and responds with an address. In the case of an ESQK, the ALI database steers (redirects) the query to the appropriate VoIP positioning center and steers the response back to the querying PSAP).

The SIP INVITE command from the SS7 to SIP gateway 100 preferably includes the following parameters:
a) The "from" field
  =the dialed digits from the VoIP caller 190 (NPA-xxx-yyyy)
b) The "to" field
  =911
c) The CBN field
  =callback number of the VoIP caller 190

The SS7 to SIP gateway 100 receives routing instruction from the VoIP positioning center (VPC) 120 and sends the routing key (e.g., emergency services query key (ESQK), a trunk select code (e.g., emergency services routing number (ESRN)), and optionally an i1 public switched telephone network (PSTN) number (e.g., last routing option (LRO)) back to the MSC 150. (The ESRN is a 10-digit number that specifies the selective router 140 to be used to route a call. The LRO is routing information sent by the VPC 120 that provides a "last chance" destination for a call, for example the contingency routing number (CRN) or a routing number associated with a national call center.)

The call then proceeds as it otherwise would for a wireless E911 call.

Figure 2:
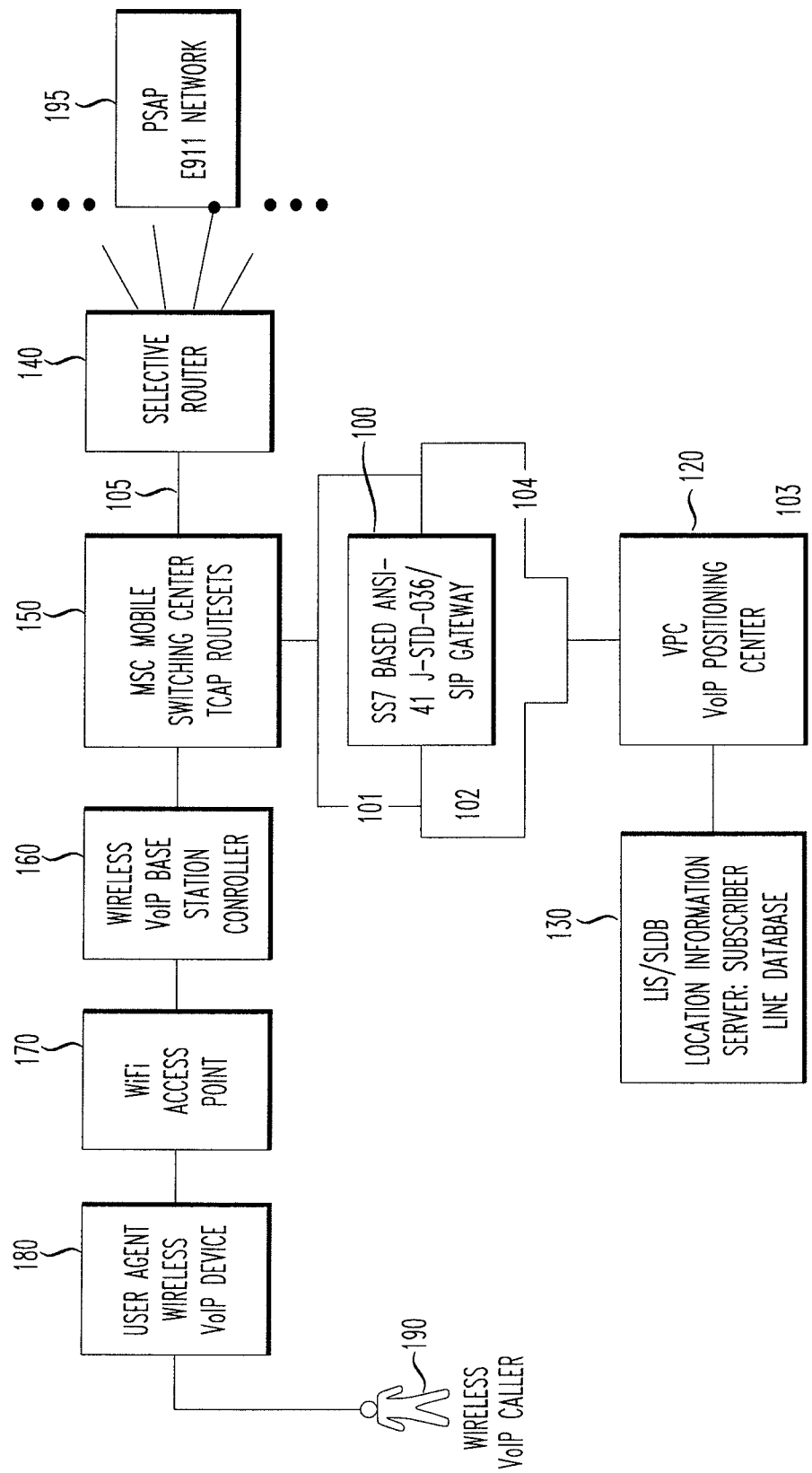
FIG. 2 is a call flow diagram showing relevant call flow with respect to the use of an SS7 based ANSI-41 J-STD-036 to SIP protocol conversion gateway, in accordance with the embodiment shown in FIG. 1.

FIG. 2 is a call flow diagram showing relevant call flow with respect to the use of an SS7 based ANSI-41 J-STD-036 to SIP protocol conversion gateway, in accordance with the embodiment shown in FIG. 1.

In particular, as shown in step 101 of FIG. 2, a caller 190 makes an E911 call while connected via a wireless IP based network.

The E911 call requires routing to a Public Safety Answering Point (PSAP) 195 based upon the street address of the caller (e.g., MSAG quality location data), which may be provisioned beforehand by the service provider based on, e.g., a billing address, etc. Alternatively, the E911 call can be routed to the correct PSAP 195 based on the absolute location of the caller, e.g., as determined by received data about their wireless access node such as wireless fidelity (WiFi) access point 170.

The MSC 150 sends out signaling data related to the wireless E911 call using the J-STD-036/TCAP protocol standard, including use of a TCAP message OriginationRequest (OR-REQ). The TCAP OriginationRequest message should contain the calling party's number (CgPN) and called pary number (e.g., 911, etc.)

In step 102 of FIG. 2, the SS7 to SIP gateway 100 translates received J-STD-036/TCAP parameters into session initiation protocol (IETF), i.e., into SIP INVITE parameters.

In step 103 of FIG. 2, the VoIP positioning center (VPC) 120 assigns routing based upon the location retrieved from the location information service/subscriber line database (LIS/SLDB) 130.

Preferably the SLDB is configured so that no modifications are required to the core conventional existing VoIP E9-1-1 network. The SLDB 130 is used to relate a Session Initiated Protocol (SIP) Universal Resource Identifier (URI) or a telephone number to a PSAP. In databases that use tables in lieu of GIS for routing determination, the address of the "subscriber" can be any valid street address within the jurisdiction of the PSAP.

In step 104 of FIG. 2, the SS7 to SIP gateway 100 receives routing instruction from the VoIP positioning center (VPC) 120, including an emergency services query key (ESQK) and an emergency services routing number (ESRN), and translates these NENA i2 standard elements into wireless E911 elements, e.g., ESQK=ESRK; ESRN=Trunk select code; and, optionally an i1 PSTN number, e.g., (LRO)).

In step 105 of FIG. 2, the MSC 150 then egresses the call based upon the ESRK and the trunk select code for use by the selective router 140. The selected selective router 140 delivers the call to the assigned PSAP, e.g., PSAP 195, based upon the ESRK.

In another aspect of the invention, SS7 based TCAP/MAP/Lg+ signaling is translated to SIP for purposes of E911 call routing.

Figure 3:
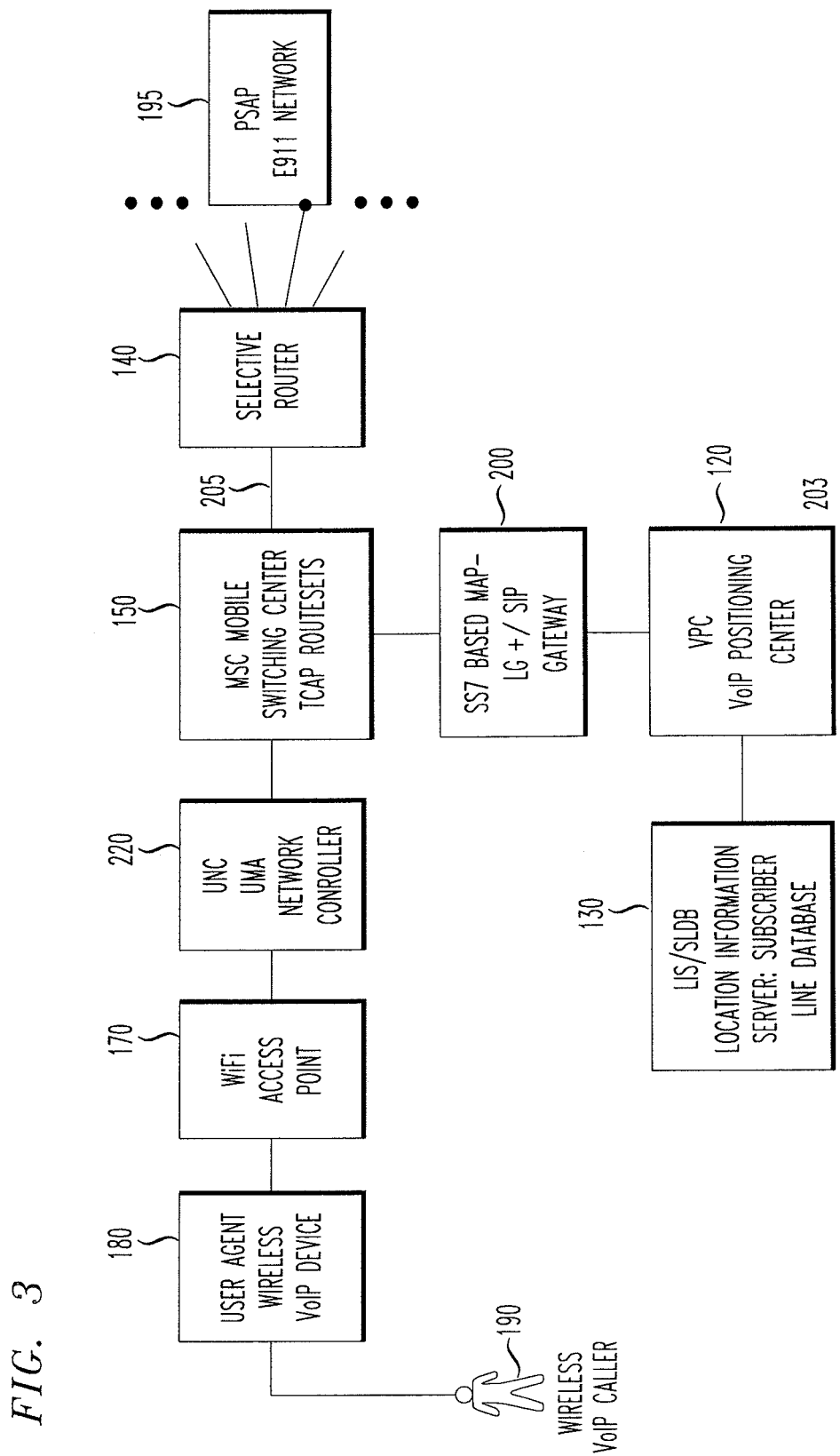
FIG. 3 is a block diagram showing relevant software elements including an SS7 based MAP-Lg+ to SIP protocol conversion gateway used to handle placement of an E911 call from a VoIP user through a wireless carrier including switched network components, in accordance with the principles of the present invention.

FIG. 3 is a block diagram showing relevant software elements including an SS7 based MAP-Lg+ to SIP protocol conversion gateway used to handle placement of an E911 call from a VoIP user through a wireless carrier including switched network components, in accordance with the principles of the present invention.

In particular, FIG. 3 shows calls from a wireless MSC processed by a SS7 to SIP gateway 200 that accepts and sends SS7 TCAP (Transaction Capability Application Part)/MAP based signaling (Lg+ interface), but gateways the signaling to SIP protocol signaling. Again, ideally the SIP signaling is compliant to a relevant standard for SIP signaling in a VoIP network, if existing and in place.

The 911 call from the wireless VoIP user 190 is routed to the wireless carrier's Mobile Switching Center (MSC) 150 via a user agent 180 for the wireless VoIP device, a WiFi access point 170, and a UMA network controller UNC 220.

This aspect of the invention creates an SS7 based gateway 200 that translates from mobile application part; interface specification Lg+ (MAP Lg+) to SIP. The SS7 based MAP-Lg+ to SIP gateway 200 is in communication with the MSC 150, and serves as a translator between wireless technologies and VoIP location technologies.

The SS7 based MAP-Lg+ to SIP gateway 200 translates the call data received from the MSC 150 (e.g., calling party number) into SIP INVITE parameters, which are then passed to a VPC 120 as a voice over IP (VoIP) call.

The SS7 based MAP-Lg+ to SIP gateway 200 receives routing instruction from the VPC 120 and sends a routing key (e.g., an emergency services query key (ESQK), trunk select code (e.g., emergency services routing number (ESRN), and (optionally) an i1 public switched telephone network (PSTN) number, e.g., last routing option (LRO) back to the MSC 150. The 911 call then proceeds as it would otherwise for a wireless E911 call.

Figure 4:
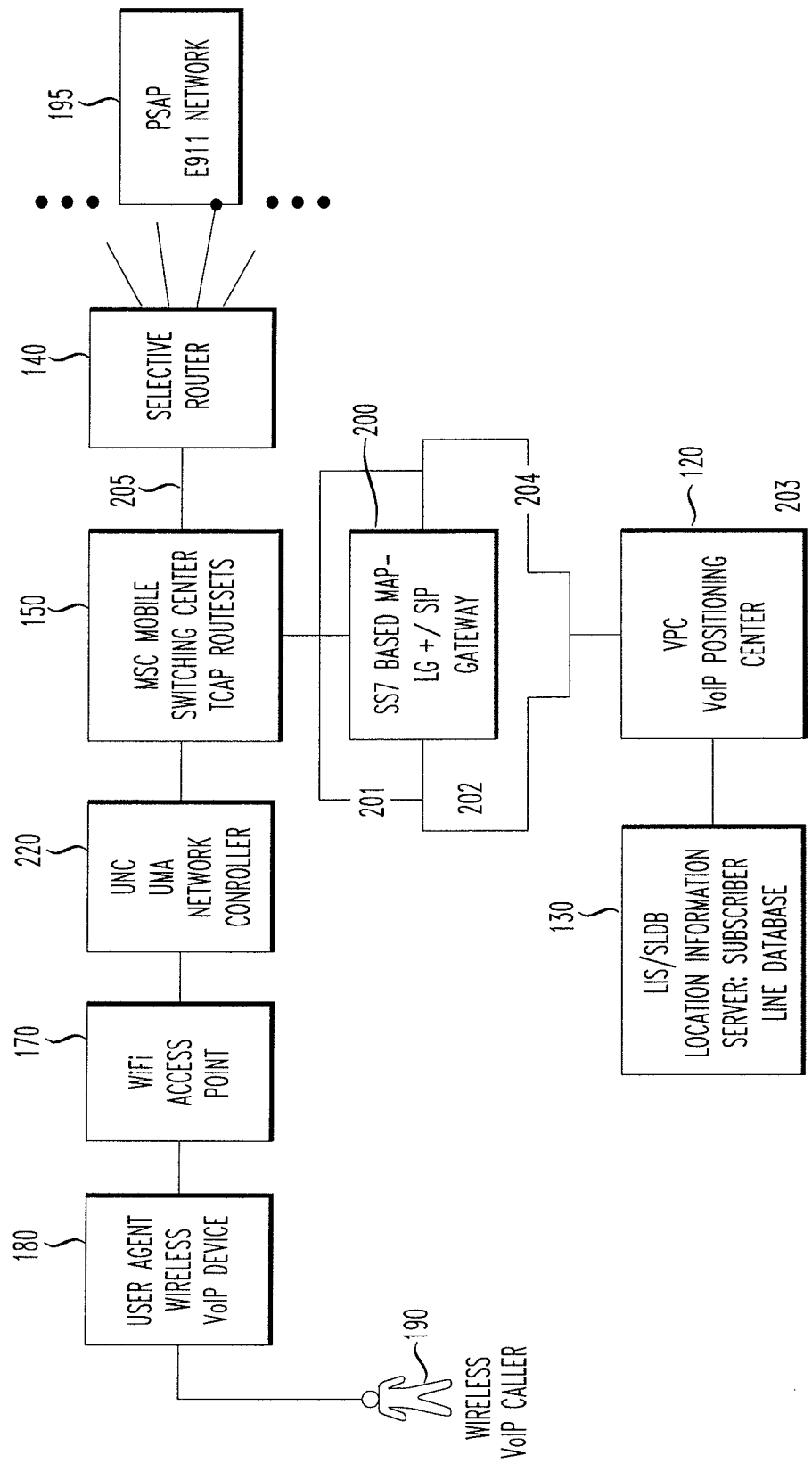
FIG. 4 is a call flow diagram showing relevant call flow with respect to the use of an SS7 based MAP-Lg+ to SIP protocol conversion gateway, in accordance with the embodiment shown in FIG. 3.

FIG. 4 is a call flow diagram showing relevant call flow with respect to the use of an SS7 based MAP-Lg+ to SIP protocol conversion gateway 200, in accordance with the embodiment shown in FIG. 3.

in particular, as shown in step 201 of FIG. 4, a caller makes an E911 call while connected via a wireless IP based network. The 911 call requires routing to a public safety answering point (PSAP) based upon the street address of the wireless VoIP caller 190 (which is provisioned beforehand), or their absolute location (determined by received data about the wireless access node associated with the WiFi access point 170.

The MSC 150 sends out signaling data related to the VoIP 911 call over a WiFi network using MAP/Lg+. Preferably the MAP message, i.e., "SubscriberLocationReport (SLR)" contains the calling party number (CgPN) and called party number (i.e., 911 etc).

In step 202 of FIG. 4, the SS7 based MAP-Lg+ to SIP conversion gateway 200 translates received MAP/Lg+ parameters into SIP INVITE parameters.

In step 203 of FIG. 4, the VPC 120 assigns routing based upon the location retrieved from the relevant location information server (LIS)/subscriber line database (SLDB).

In step 204 of FIG. 4, the SS7 based MAP-Lg+ to SIP conversion gateway 200 receives routing instruction from the VPC 120 (e.g., an emergency services query key (ESQK) and an emergency services routing number (ESRN), and translates these NENA i2 standard elements into Wireless E9-1-1 elements. For instance, the ESQK is translated into an emergency services routing key (ESRK), the ESRN is translated into a trunk select code for use by the selective router 140, and optionally an i1 PSTN phone number, e.g., last routing option (LRO).

In step 205 of FIG. 4, the MSC 150 then egresses the 911 call based upon the ESRK and the trunk select information to the relevant selective router 140, which delivers the 911 call to the PSAP based upon the ESRK.

In yet another aspect of the invention, SS7 based ISUP signaling is translated to SIP, e.g., for purposes of E911 call routing.

Figure 5:
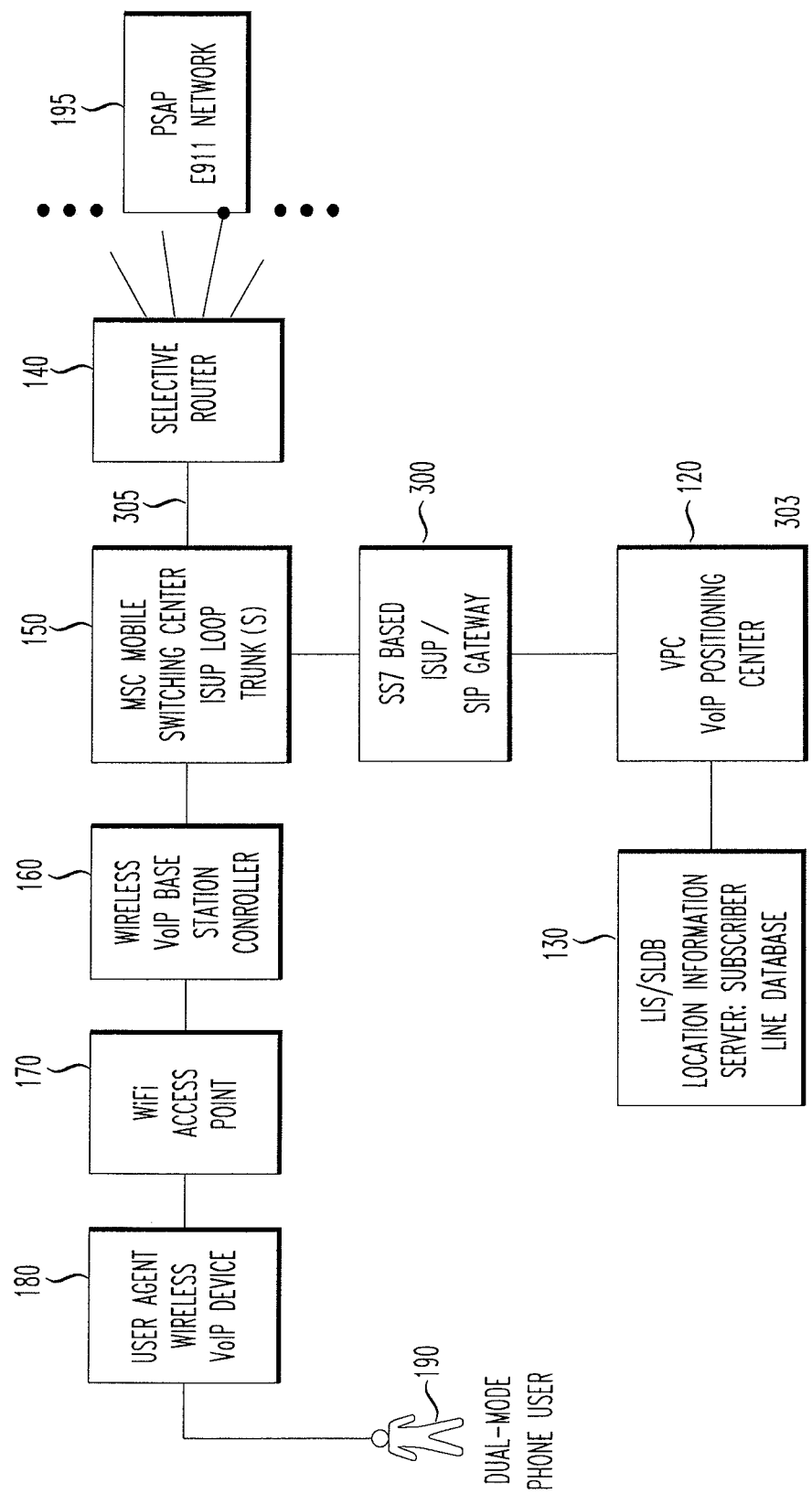
FIG. 5 is a block diagram showing relevant software elements including an SS7 based ISUP to SIP protocol conversion gateway used to handle placement of an E911 call from a VoIP user through a wireless carrier including switched network components, in accordance with the principles of the present invention.

FIG. 5 is a block diagram showing relevant software elements including an SS7 based ISUP to SIP protocol conversion gateway used to handle placement of an E911 call from a VoIP user through a wireless carrier including switched network components, in accordance with the principles of the present invention.

In particular, FIG. 5 shows calls handled by a wireless MSC 150 are processed by an SS7 based ISUP to SIP conversion gateway 300 that accepts and sends SS7 ISUP based signaling, but gateways the signaling to SIP signaling. Preferably, the SIP signaling to which the SS7 based ISUP to SIP conversion gateway 300 converts is fully compliant to any applicable standard, if available.

The 911 call from the wireless VoIP user 190 is routed to the wireless carrier's Mobile Switching Center (MSC) 150 as shown. The SS7 based ISUP to SIP conversion gateway 300 then translates from integrated services user part (ISUP) protocols into SIP protocol signaling.

The SS7 based ISUP to SIP conversion gateway 300 is in communication with the MSC 150, and serves as a translator between wireless and VoIP location technologies. The SS7 based ISUP to SIP conversion gateway 300 translates call data received from the MSC 150 (e.g., calling party number) into appropriate SIP INVITE parameters, which are then passed to the VPC 120 as a VoIP call.

The SS7 based ISUP to SIP conversion gateway 300 receives routing instruction from the VPC 120 and sends the routing key (e.g., the emergency services query key (ESQK), trunk select code (e.g., emergency services routing number (ESRN), and (optionally) an i1 public switched telephone network (PSTN) phone number, e.g., last routing option (LRO) back to the MSC 150. The VoIP/WiFi 911 call then proceeds as it would for a wireless E911 call.

Figure 6:
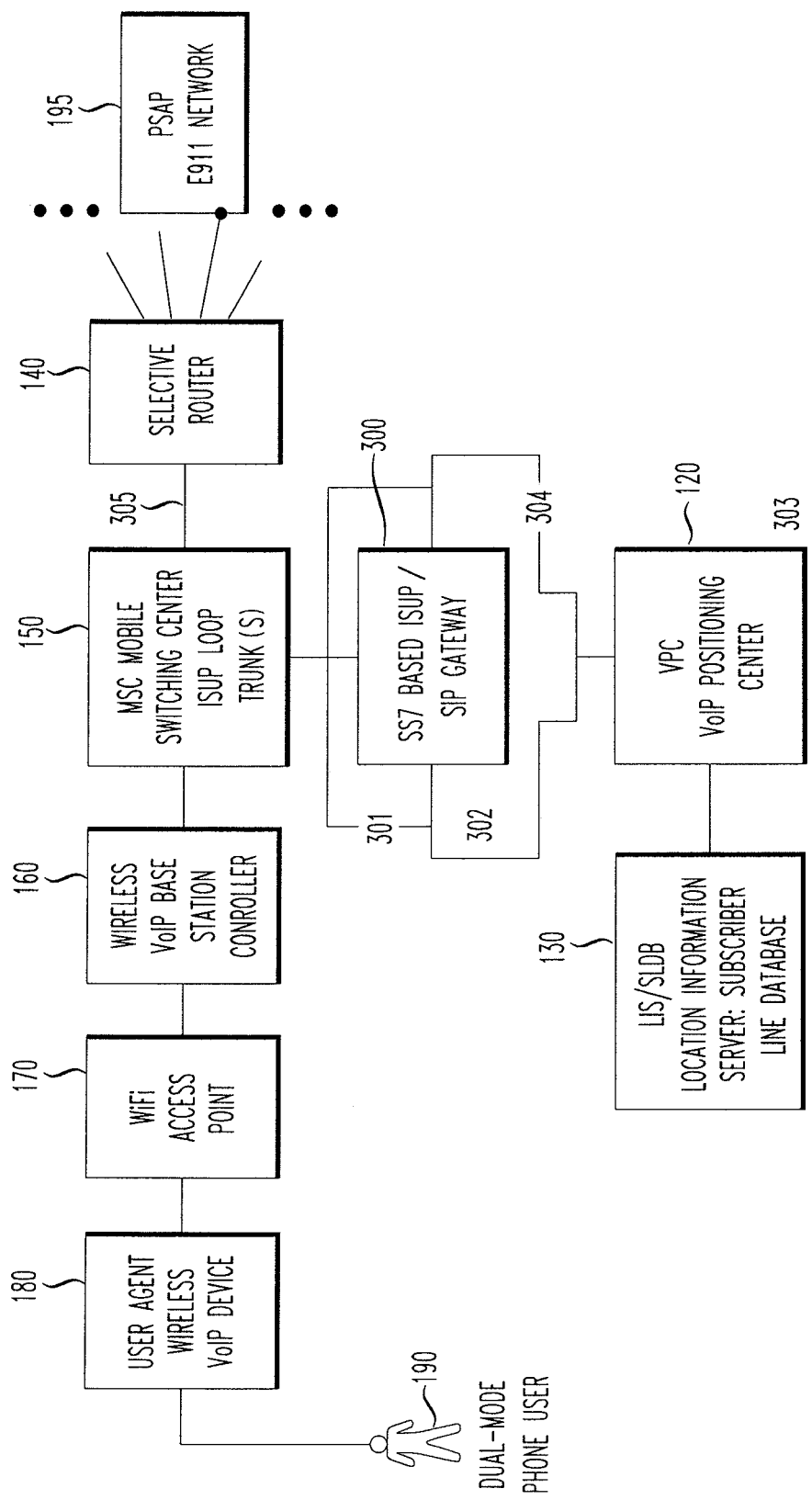
FIG. 6 is a call flow diagram showing relevant call flow with respect to the use of an SS7 based ISUP to SIP protocol conversion gateway, in accordance with the embodiment shown in FIG. 5.
Figure 7A:
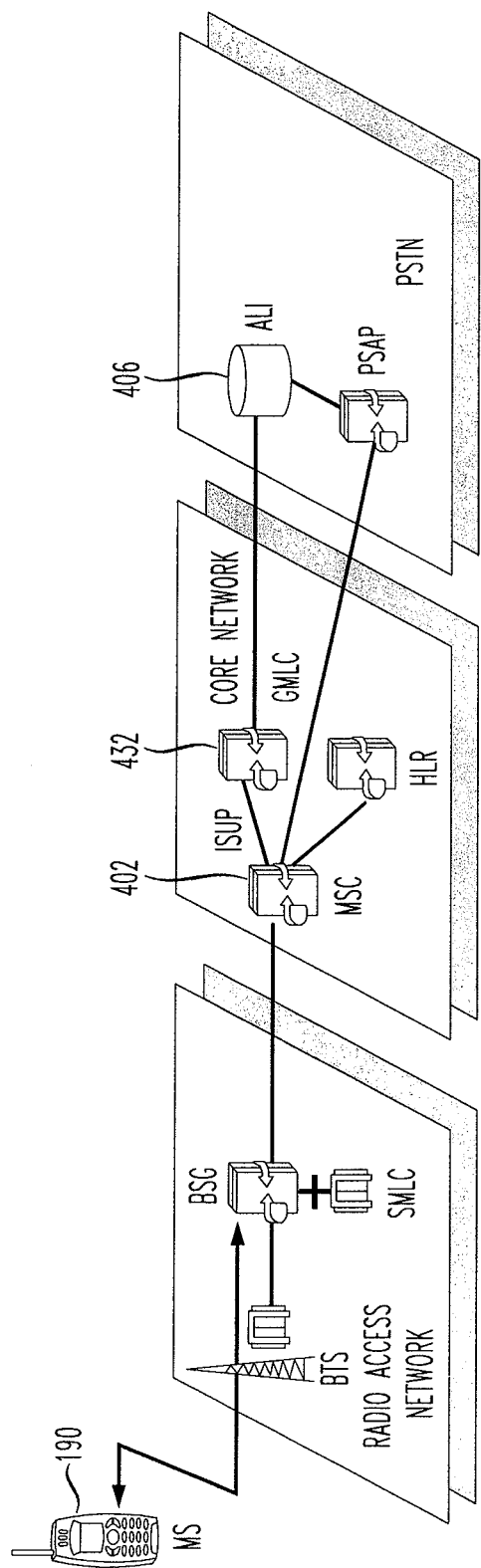
FIG. 7A shows conventional relevant systems in an emergency 911 call made via a wireless caller in a GSM network.
Figure 7B:
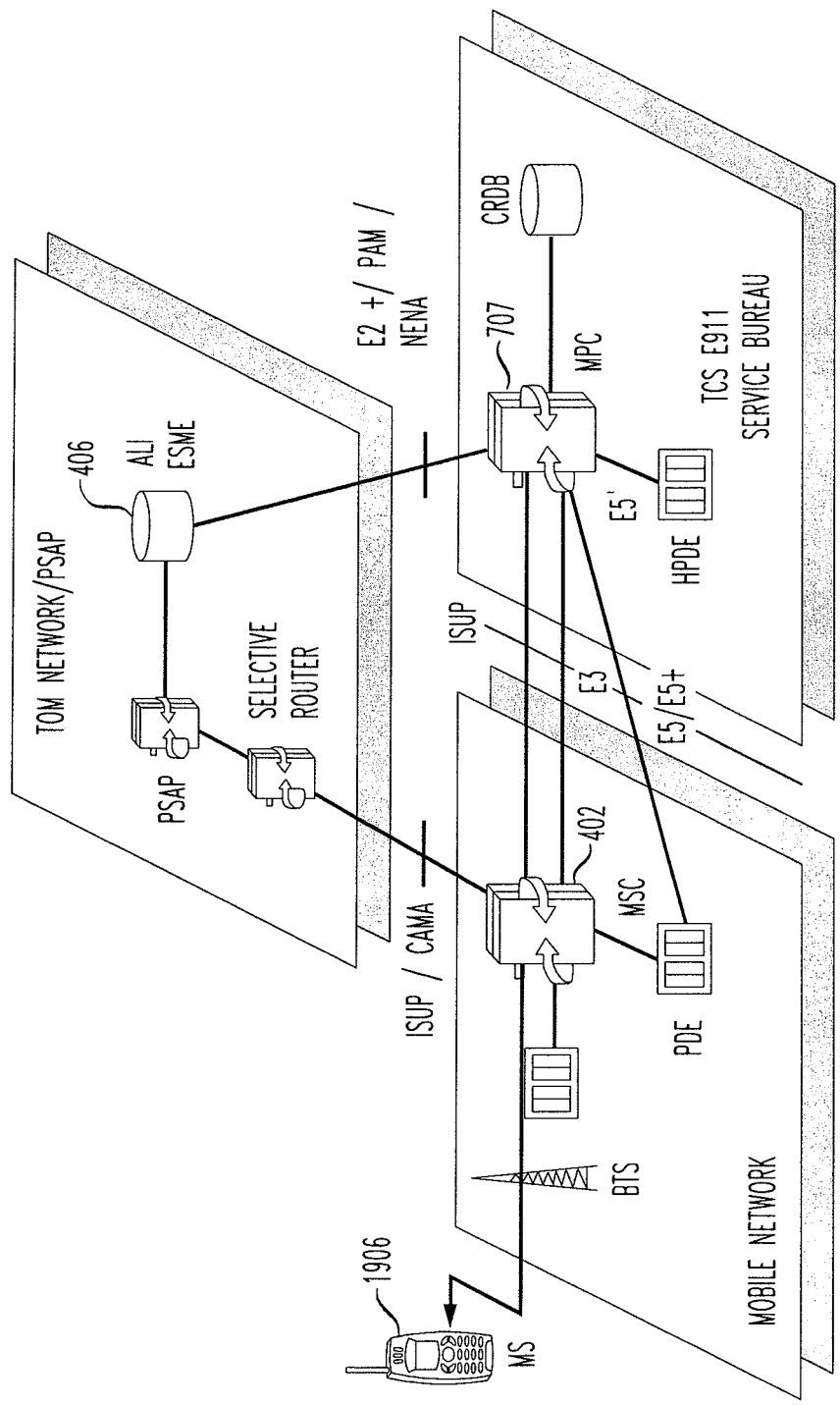
FIG. 7B shows conventional relevant systems in an emergency 911 call made via a wireless caller in a CDMA or TDMA network.

FIG. 6 is a call flow diagram showing relevant call flow with respect to the use of an SS7 based ISUP to SIP protocol conversion gateway 300, in accordance with the embodiment shown in FIG. 5.

In particular, as shown in step 301 of FIG. 6, a caller makes an E911 call while connected via a wireless IP based network (e.g., WiFi). The call requires routing to an appropriate public safety answering point (PSAP) based upon the street address of the dual-mode phone user 190 (which is provisioned beforehand), or their absolute location (e.g., determined by received data about the lat/lon of the WiFi wireless access node 170.

The MSC 150 sends out signaling data related to the call using ISUP. Preferably, the IAM contains the calling party number (CgPN) and called party number (e.g., 911, 411, etc.)

In step 302 of FIG. 6, the SS7 based ISUP to SIP conversion gateway 300 translates received ISUP IAM parameters into relevant SIP INVITE parameters.

In step 303 of FIG. 6, the VPC 120 assigns routing based upon the location retrieved from the location information server (LIS) or subscriber line database (SLDB) 130.

In step 304 of FIG. 6, the SS7 based ISUP to SIP conversion gateway 300 receives routing instruction from the VPC 120. Exemplary routing instruction includes an emergency services query key (ESQK) and an emergency services routing number (ESRN), and translates these NENA i2 standard elements into Wireless E9-1-1 elements. For instance, an ESQK is translated into an emergency services routing key (ESRK), an ESRN is converted into a trunk select code for the relevant selective router 140, and optionally an i1 PSTN number, e.g., last routing option (LRO).

In step 305 of FIG. 6, the MSC 150 then egresses the call to the proper selective router 140 based upon the ESRK and trunk select information. The selective router 140 then delivers the E911 call to the proper PSAP 195 based upon the ESRK information.

Accordingly, use of an SS7 to SIP conversion gateway in accordance with the principles of the present invention provides for a low cost architecture that has the ability to ease the transition from circuit switched routing of wireless calls (including emergency calls such as E911) to Internet Protocol (IP) based routing of wireless calls (i.e., voice over IP (VoIP)).

The invention has applicability to wireless carriers, and in particular to the use of dual-mode phones over local area wireless networks such as WiFi networks.

While the invention has been described with reference to the exemplary embodiments thereof, those skilled in the art will be able to make various modifications to the described embodiments of the invention without departing from the true spirit and scope of the invention.

What is claimed is:

1. A call protocol conversion gateway, comprising:
   a mobile switching center to receive a VoIP call over signaling system number 7 (SS7)—based call signaling;
   a SS7-to-SIP gateway to convert said SS7 ISUP based call signaling into session initiation protocol (SIP)—based call signaling, and to pass said SIP call signaling to a voice over Internet (VoIP) positioning center (VPC);
   wherein the VoIP positioning center (VPC) assigns routing based upon the location retrieved from a location information service/subscriber line database (LIS/SLDB)
   wherein said SS7-to-SIP gateway converts an emergency services query key (ESQK) into an emergency services routing key (ESRK), and provides said converted ESRK to said mobile switching center for passage to an appropriate selective router.

2. The call protocol conversion gateway according to claim 1, wherein:
   said VoIP call is a wireless 911 call.

3. The call protocol conversion gateway according to claim 1, wherein:
   said VoIP call is a VoIP wireless call made via a local area network.

4. The call protocol conversion gateway according to claim 3, wherein:
   said local area network is a wireless fidelity (WiFi) network.

5. A method of converting a VoIP call, passed over a switched telephone network, into SS7 call signaling for presentation to a public safety access point (PSAP), comprising:
   receiving a voice over Internet protocol (VoIP) call from a VoIP phone via a SS7-based call signaling network;

converting said SS7 call signaling into session initiation protocol (SIP)-based call signaling;

assigning, by a VoIP positioning center (VPC), routing, based upon the location retrieved from a location information service/subscriber line database (LIS/SLDB)

converting an emergency services query key (ESQK) into an emergency services routing key (ESRK); and routing said converted ESRK over an appropriate selective router.

6. The method of converting a VoIP call, passed over a switched telephone network, into SS7 call signaling for presentation to a public safety access point (PSAP) according to claim 5, wherein:

said VoIP call is received from a wireless fidelity (WiFi) network.

7. The method of converting a VoIP call, passed over a switched telephone network, into SS7 call signaling for presentation to a public safety access point (PSAP) according to claim 5, wherein:

said VoIP phone is a wireless phone.

8. The method of converting a VoIP call, passed over a switched telephone network, into SS7 call signaling for presentation to a public safety access point (PSAP) according to claim 5, wherein:

said VoIP phone is a dual mode phone.

9. The method of converting a VoIP call, passed over a switched telephone network, into SS7 call signaling for presentation to a public safety access point (PSAP) according to claim 8, wherein:

said dual mode phone has a first mode operable in a cellular phone network, and a second mode operable in a wireless fidelity (WiFi) network.

10. The method of converting a VoIP call, passed over a switched telephone network, into SS7 call signaling for presentation to a public safety access point (PSAP) according to claim 6, further comprising:

assigning said routing based upon a location retrieved from said converted location information service/subscriber line database (LIS/SLDB) location information.

11. The call protocol conversion gateway according to claim 1, wherein:

said SS7-to-SIP gateway further converts an emergency services routing number (ESRN) into a trunk select code, and provides said converted trunk select code to said mobile switching center for passage to an appropriate selective router.

12. The call protocol conversion gateway according to claim 5, further comprising:

converting an emergency services routing number (ESRN) into a trunk select code, and providing said converted trunk select code to said mobile switching center for passage to an appropriate selective router.

\* \* \* \* \*